United States Patent [19]

Hayakawa et al.

[11] Patent Number: 4,532,898
[45] Date of Patent: Aug. 6, 1985

[54] FUEL INJECTION TYPE INTERNAL COMBUSTION ENGINE

[75] Inventors: Kizo Hayakawa; Nobuyuki Mori; Yoshio Watanabe; Kazumi Nakashima, all of Aichi, Japan

[73] Assignees: Kabushiki Kaisha Toyota Chuo Kenkyusho, Aichi; Kabushiki Kaisha Toyoda Jidoshokki Seisakusho, Kariya, both of Japan

[21] Appl. No.: 559,886

[22] Filed: Dec. 9, 1983

[30] Foreign Application Priority Data

Dec. 13, 1982 [JP] Japan .................. 57-218112

[51] Int. Cl.³ ............................ F01L 3/00; F02B 3/04
[52] U.S. Cl. ..................................... 123/276; 123/281
[58] Field of Search ................ 123/276, 281, 282, 285

[56] References Cited

U.S. PATENT DOCUMENTS

| | | | |
|---|---|---|---|
| 4,015,577 | 4/1977 | Elsbett et al. | 123/276 |
| 4,235,202 | 11/1980 | Buddenhagen | 123/276 |
| 4,278,057 | 7/1981 | Urlaub et al. | 123/276 |
| 4,428,340 | 1/1984 | Nikly | 123/276 |

*Primary Examiner*—Raymond A. Nelli
*Attorney, Agent, or Firm*—Oblon, Fisher, Spivak, McClelland & Maier

[57] ABSTRACT

In a fuel injection type internal combustion engine including a cylinder body with a cylinder chamber, a cylinder head, a piston adapted to be reciprocated within the cylinder chamber, an injection nozzle having its central axis inclined with respect to the top of the piston and its injection port offset from the center of the cylinder chamber, and a combustion chamber cavity opened in the top of the piston, an auxiliary cavity defined by a notched wall having complicatedly cut surfaces is formed in the opening portion of the combustion chamber cavity. The notched wall is formed in a manner to follow the conical surface of a cone, in response to the piston travel, the cone having as its apex a point located upstream of the injection port, as its center the central axis of the injection nozzle, and as its apex angle the maximum spray diverging angle of the injection nozzle. With this structure, the collision of injected fuel against the combustion chamber cavity wall is prevented while minimizing the reduction in the compression ratio of the engine.

6 Claims, 5 Drawing Figures

FUEL INJECTION TYPE INTERNAL COMBUSTION ENGINE

BACKGROUND OF THE INVENTION

1. Field of the Invention

The present invention relates to an internal combustion engine of the type, in which a fuel is injected directly from an injection nozzle into a combustion chamber and more particularly to a Diesel engine.

2. Description of the Prior Art

In the Diesel engine of the direct fuel injection type, the piston has its top formed with a combustion chamber cavity, and an injection nozzle is arranged concentrically of the central axis of that combustion chamber cavity. In case the spray diverging angle of the injection nozzle is no less than 20 degrees, on the other hand, the aforementioned cavity is shaped to have a larger diameter at its deep portion than that in the open portion at the piston top so that the sprayed fuel may not impinge, just after it has been injected, upon the surface of the piston at the shortest distance.

In such internal combustion engine, when an injection nozzle is intended to have a larger spray diverging angle no less than 60 degrees so as to atomize and disperse the fuel spray in a manner to ensure satisfactory combustion, the combustion chamber cavity to be formed in the piston must have a still larger diameter at its deep portion than that in the open portion. As a result, the compression ratio of the engine is lowered, and the Diesel engine cannot attain a sufficiently high spontaneous ignition temperature immediately after it is started.

SUMMARY OF THE INVENTION

It is an object of the present invention to provide a fuel injection type internal combustion engine in which the decrease of the compression ratio is minimized and which enables free selection of the correlations between the position of an injection nozzle and the position of a combustion chamber cavity formed in a piston even if the injection nozzle adopted has a large spray diverging angle.

Another object of the present invention is to make it possible to augment the degree of freedom of designing the positions of intake and exhaust valves, the areas of these valves, the positions of head bolts for fastening a cylinder head on a cylinder body, the arrangements of cooling water passages and so on, by positioning the leading end of the injection nozzle in the combustion chamber eccentrically of the center of the cylinder chamber.

A fuel injection type internal combustion engine according to the present invention comprises: a cylinder body formed with a cylinder chamber; a cylinder head mounted on the cylinder body; a piston adapted to be reciprocated within the cylinder chamber and to define a combustion chamber between the top thereof and the cylinder head; an injection nozzle mounted at a predetermined position in one of the cylinder head and the cylinder body for injecting fuel into the combustion chamber, the injection nozzle having its central axis inclined at a predetermined angle with respect to the top of the piston and its leading end portion facing the combustion chamber in a manner that its injection port is offset from the center of the cylinder chamber; and a combustion chamber cavity opened in the top of the piston and an auxiliary cavity formed in the opening portion of the combustion chamber cavity. The auxiliary cavity is defined by a notched wall with complicatedly cut surfaces determined by the shapes of fuel injection pattern during the fuel injection, the shape of the combustion chamber cavity and the positional relationship between the fuel injection pattern and the combustion chamber cavity in response to the piston travel during the fuel injection. The notched wall with complicatedly cut surfaces may be formed by following a conical surface of a cone which is relatively moved with respect to the piston while the piston travels between the top dead center and one of the before top dead center position where fuel injection starts and the after top dead center position where fuel injection terminates, said one of the before and after top dead center position having a larger predetermined distance to the top dead center than the other, the cone being drawn by employing (1) as its apex a point located at a predetermined distance upstream of the injection port of the injection nozzle along the central axis thereof, (2) as its center the central axis of the injection nozzle and (3) as its apex angle the predetermined maximum spray diverging angle of the injection nozzle. Thus injected fuel is prevented from colliding against the wall of the combustion chamber cavity.

The auxiliary cavity preferably has a volume ranging from 0.3 to 10% of the total volume of the combustion chamber cavity and the auxiliary cavity. Further, the present invention is particularly superior in the case of the maximum spray diverging angle ranging from 20 to 120 degrees with respect to the central axis of the injection nozzle.

The above and other objects, features and advantages of the present invention will become more apparent from the following description when taken in conjunction with the accompanying drawings in which certain preferred embodiments of the invention are shown by way of illustrative example.

DETAILED DESCRIPTION

The present invention will now be described in connection with the embodiment with reference to FIGS. 2 and 3 in contrast to the prior art shown in FIG. 1.

Figure 1:
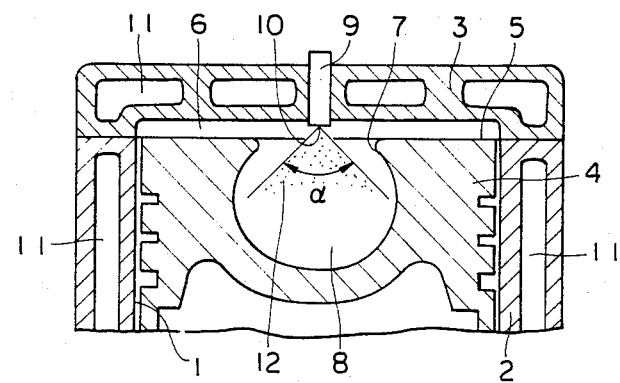
FIG. 1 is a sectional view showing an essential portion of the direct injection type Diesel engine of the prior art.
Figure 2:
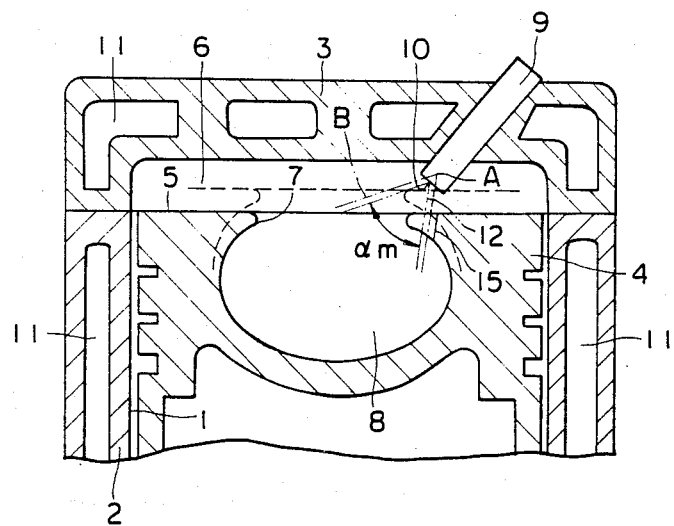
FIG. 2 is a sectional view showing an essential portion of the embodiment in which the present invention is applied to the direct injection type Diesel engine.

FIG. 1 is a sectional view showing an essential portion of one cylinder of a direct fuel injection type Diesel engine, and FIG. 2 is a sectional view showing an essential portion of one cylinder of one embodiment in which the present invention is applied to a direct fuel injection type Diesel engine.

As shown, a cylinder head 3 is fixedly fastened by means of head bolts (although not shown) to the upper portion of the cylinder body 2 which is formed with a cylinder chamber 1. A piston 4 is fitted in the aforementioned cylinder 1 and is reciprocated in the central axis direction of the cylinder chamber 1 by the action of a crankarm (not shown) while defining a combustion chamber 6 between the top 5 of the piston 4 and the cylinder head 3. The piston 4 is formed in its top 5 with a throttled opening 7 which communicates with the combustion chamber 6. The throttled opening 7 is formed with a bottomed and recessed combustion chamber cavity 8 which is formed so that its diameter in a plane normal to the central axis of the cylinder chamber 1 is larger in its deep portion than in the aforementioned opening 7. In the cylinder head 3, there is mounted an injection nozzle 9, which has its leading end injection port 10 positioned just above the opening 7 of the combustion chamber cavity 8 at the top dead center of the piston 4 for spraying a fuel into said cavity 8. In addition, cooling water passages 11 are formed in the cylinder body 2 and the cylinder head 3, and intake and exhaust valves (not shown) are provided.

In the prior art shown in FIG. 1, the injection nozzle 9 has its central axis aligned with that of the combustion chamber cavity 8. This cavity 8 has its depth determined such that the fuel particles of large size to be injected in the central axis direction of a spray 12 seldom impinge upon the bottom wall of said combustion chamber cavity 8 and its volume determined such that the reduction in the compression ratio can be prevented as much as possible. In case, however, the injection nozzle 9 has a larger spray diverging angle α, there is a danger that the fuel droplets at the outermost side of the spray 12 are liable to impinge upon the side wall of the combustion chamber cavity 8 thereby generating black or white smoke in the engine exhaust gas. It is, therefore, necessary to make larger the diameter of the largest diameter portion of the combustion chamber cavity 8, which in turn enlarges uselessly the volume of the combustion chamber 6, thereby inviting reduction in the compression ratio.

Figure 3:
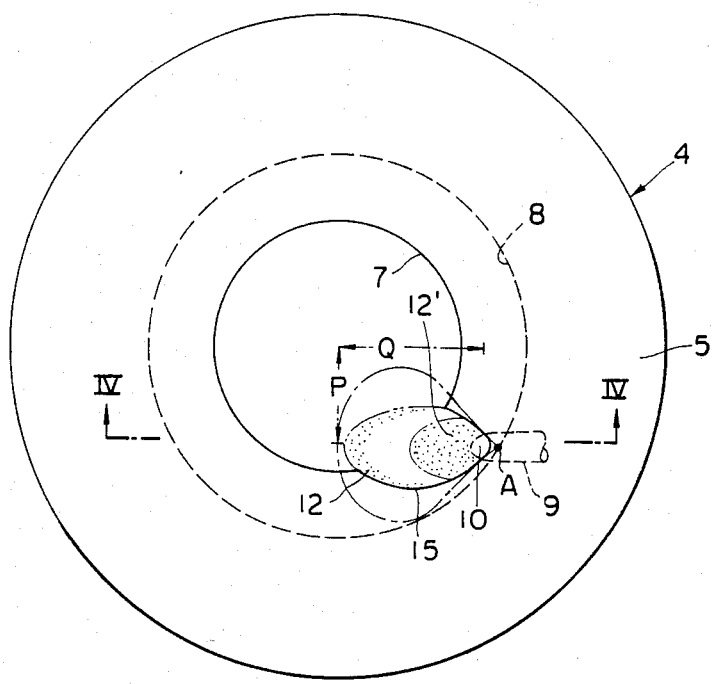
FIG. 3 is a top plan view showing the piston of that engine.

The injection nozzle 9 of the embodiment according to the present invention is mounted in the cylinder head 3, as shown in FIG. 2 and in FIG. 3 showing the top face of the piston 4, such that its central axis is inclined with respect to the central axis of the combustion chamber cavity 8. The injection port 10 at its leading end is positioned just above the open edge of the throttled opening 7 of the combustion chamber cavity 8 formed in the top 5 of the piston 4, and the central axis of the injection nozzle 9 (i.e. the central axis of the spray 12) is directed, as shown in FIG. 3, toward the center of the combustion chamber cavity 8 in the plane shown in FIG. 2 and in the tangential direction of the cumbustion chamber cavity 8 in the plane shown in FIG. 3, thereby injecting the fuel from its throttled open portion 7 into the combustion chamber cavity 8. In the plane of FIG. 3, more specifically, the central axis of the injection nozzle 9 is located at a distance P from the center of the combustion chamber cavity 8, and the injection port 10 of the injection nozzle 9 is located at a distance Q from the center of the combustion chamber cavity 8 in the direction along the central axis of the injection nozzle 9.

Figure 4:
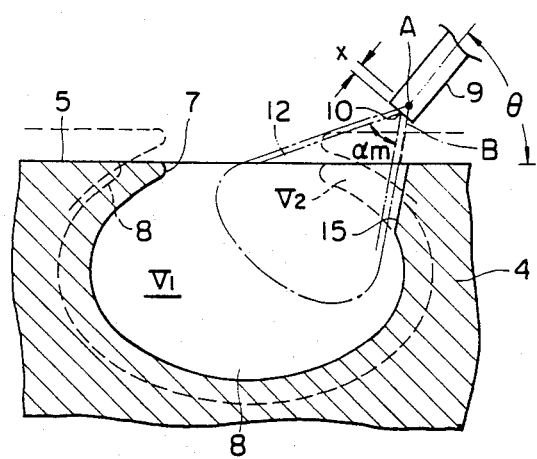
FIG. 4 is a sectional view showing an essential portion and taken along line IV—IV of FIG. 3.

FIG. 4 is a sectional view showing the combustion chamber cavity 8 and taken along a plane containing the central axis of the injection nozzle 9 along line IV—IV of FIG. 3. The central axis of the injection nozzle 9 is inclined at an angle θ with respect to the top 5 of the piston 4. In the top of the piston 4, moreover, there is formed in a portion of the open edge of the throttled opening 7 of the combustion chamber cavity 8, an auxiliary cavity defined by a notched wall 15 with complicatedly cut surfaces formed by following a conical surface B (indicated by the one-dot chain line) of a cone which is relatively moved with respect to the piston 4 while the piston 4 travels between the top dead center (indicated by a broken line) and one (indicated by a solid line) of the before top dead center position where the fuel injection starts (e.g. 25 degrees in terms of a crank angle) and the after top dead center position where the fuel injection terminates (e.g. 15 degrees in terms of a crank angle), said one of the before and after top dead center positions having a larger predetermined distance to the top dead center position (i.e. having a larger crank angle) than the other. Such cone is drawn by employing (1) as its apex a point A located at a predetermined distance x upstream of the injection port 10 of the injection nozzle 9 along the central axis thereof, (2) as its center the central axis of the injection nozzle 9 and (3) as its apex angle the predetermined maximum spray diverging angle αm of the spray 12 (shown by the two-dotted chain line) of the fuel to be injected from the injection nozzle 9. As a result, the volume $V_2$ of the auxiliary cavity is added to the volume $V_1$ of the combustion chamber cavity before said notched wall 15 is formed.

In the Diesel engine in which the piston 4 formed with the notched wall 15 is fitted, the fuel injected from the injection port 10 of the injection nozzle 9 is not allowed to impinge upon the top 5 of the piston 4 but is injected into the combustion chamber cavity 8 along the notched wall 15. For confirmation, there was prepared a Diesel engine (hereinafter referred to as an "original engine") in which: the piston 4 is formed in its top 5 with the combustion chamber cavity 8 having the volume $V_1$ of 22 cc; a displacement $V_S$ of one cylinder is 500 cc; the volume $V_0$ of the combustion chamber at the top dead center of the piston 4 is 30 cc; and a compression ratio $\epsilon = V_S/V_0 + 1$ is set at 17.67. Then, the injection nozzle 9 was disposed by suitably selecting the aforementioned distances P and Q and angle θ. There were also prepared a number of pistons 4 each being formed in its open edge of the opening 7 of the combustion chamber cavity 8 with the notched wall 15 formed by following a conical surface B of a cone having as its apex the point A located at the distance X upstream of the injection port 10 of the injection nozzle 9 along the central axis thereof, as its apex angle a varied maximum spray diverging angle, and as its center the aforementioned central axis. The volume $V_2$ of each auxiliary cavity, which was added to the combustion chamber cavity 8 by formation of the notched wall 15 was measured. Then, the running operations were conducted by mounting each of those pistons 4 in the original engine.

The results are plotted in FIG. 5 in which the abscissa shows the ratio β (hereinafter referred to as the "cavity volume ratio") of the volume $V_2$ of the auxiliary cavity to the total volume $V_E = V_1 + V_2$ of the combustion chamber cavity of each of the pistons and the ordinate shows the compression ratio $\epsilon = V_S/(V_0 + V_2) + 1$.

Figure 5:
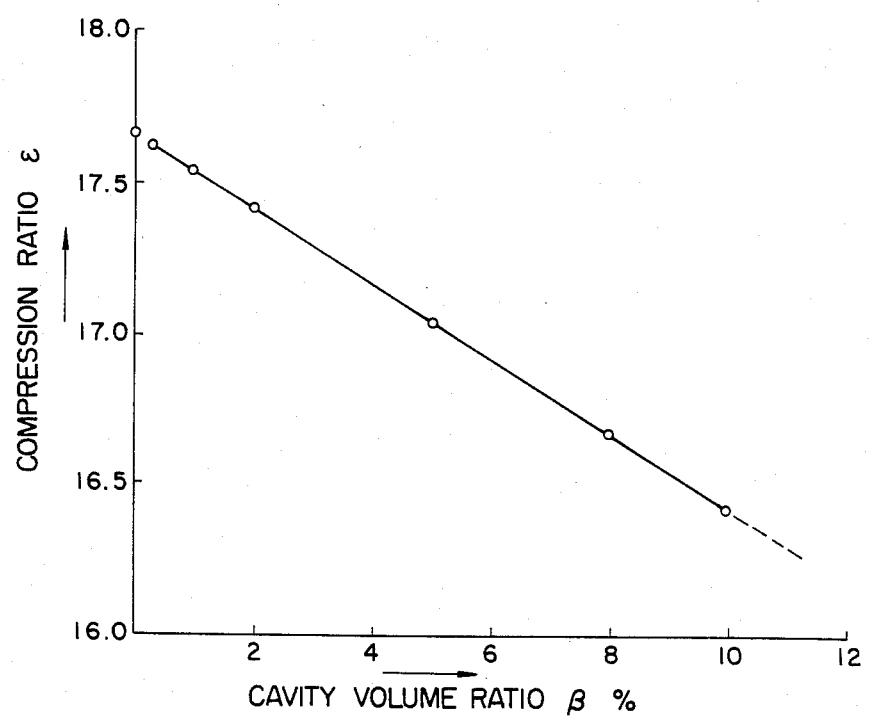
FIG. 5 is a diagram showing the relationship between the cavity volume ratio and the compression ratio.

As is apparent from FIG. 5, the relationship between the cavity volume ratio β and the compression ratio ε is depicted as a straight line which starts from a point on the ordinate indicating the compression ratio 17.67 of the original engine having no notched wall 15 and thus with the cavity volume ratio being 0.

In the running tests thus far described, with the minimum values of the aforementioned distances P and Q, the volume $V_2$ of the auxiliary cavity was 0.07 cc, the cavity volume ratio $\beta$ was 0.3%, and the compression ratio $\epsilon$ was 17.63. On the other hand, with the possibly maximum values of the distances P and Q, volume $V_2$ of the auxiliary cavity was 2.44 cc, the cavity volume ratio $\beta$ was 10.0%, and the compression ratio $\epsilon$ was 16.41.

From the experiments, it has been confirmed that, in the internal combustion engine having the maximum spray diverging angle even of 60 degrees or more and the aforementioned distances P and Q being suitably set, the object of the present invention can be sufficiently achieved merely by forming the piston top with the notched portion (as the auxiliary cavity) which has a remarkably small volume $V_2$ of about 0.44 to 0.68 cc.

In this case, the cavity volume ratio $\beta$ was only 2.0 to 3.0%, and the compression ratio 17.43 to 17.30. This means that the use of the injection nozzle having the large spray diverging angle is possible only with a slight reduction in the compression ratio, as compared with the compression ratio 17.67 of the aforementioned original engine. In the Diesel engine having the cavity volume ratio $\beta$ of 10%, the compression ratio $\epsilon$ was reduced by about a value of one, as compared with the Diesel engine having the cavity volume ratio $\beta$ of 2 to 3%. Since any further reduction in the compression ratio is not desirable, the volume $V_2$ of the auxiliary cavity, which is formed by forming a notched wall 15 in a portion of the open edge of the opening 7 of the combustion chamber cavity 8, is preferably within 0.3 to 10% of the total volume $V_E=(V_1+V_2)$ of the combustion chamber cavity. Within this volume range, the present invention is well applicable to an internal combustion engine having the injection nozzle with the maximum spray diverging angle $\alpha m$ within 20 to 120 degrees.

In the embodiment shown in FIG. 2, the distance (taken in the central axis direction of the injection nozzle 9) from the injection port 10 of the nozzle 9 to the bottom face of the combustion chamber cavity 8 becomes longer than that of the prior art example shown in FIG. 1, and further the fuel droplets injected along the conical surface B of the maximum spray deverging angle $\alpha m$ do not impinge upon the piston 4 in the vicinity of the top 5 of the piston 4, thus preventing emission of the black or white smoke.

When the central axis of the spray 12 is directed in the tangential direction of the combustion chamber cavity 8 in the plane of FIG. 3, furthermore, the spray 12 is sufficiently mixed with air by the swirls in the combustion chamber cavity 8 so that the combustion efficiency is improved.

In FIG. 3, the numeral 12 denotes the fuel injection pattern when the amount of the injected fuel is maximum, and the numeral 12' denotes the pattern at the start of fuel injection.

In the aforementioned embodiment, the opening 7 of the combustion chamber cavity 8 is of a throttled type. However, it may be of any other type.

In the reciprocating type internal combustion engine having the injection nozzle according to the present invention, the injection nozzle is made to have its central axis inclined at a predetermined angle with respect to the top of the piston and its leading end portion facing the cylinder chamber in a manner that its injection port is offset from the center of the cylinder chamber. As a result, it is possible to augment the degree of freedom of designing the positions and areas of the intake and exhaust valves and to increase the degree of freedom of both positioning the head bolts for mounting the cylinder head on the cylinder body and mounting the cooling water passages. Moreover, the combustion chamber cavity is opened in the top of the piston, and the auxiliary cavity is defined in the open edge of the combustion chamber cavity by the notched wall having complicatedly cut surfaces formed by following the conical surface of the cone during the piston travel between the top dead center position and one of the before top dead center position where fuel injection starts and the after top dead center position where fuel injection terminates, said one of the before and after top dead center positions having a larger predetermined distance to the top dead center position than the other. The conical plane is drawn by using as its apex one point located at a predetermined distance upstream of the injection port of the injection nozzle along the central axis of the injection nozzle, as its center the central axis of the injection nozzle, and as its apex angle the maximum injection angle of the spray diverging nozzle. As a result, the fuel injected from the injection nozzle of the internal combustion engine (even the fuel droplets floating at the outer circumferential portion of the conical spray) is fed into the combustion chamber cavity through the auxiliary cavity without impinging upon the top of the piston and the notched wall during the fuel injection.

Furthermore, the injection nozzle is made to have its central axis inclined with respect to the central axis of the combustion chamber cavity and offset therefrom. As a result, even if the volumetric shape of the combustion chamber cavity is equal to that of the combustion chamber cavity in the prior art internal combustion engine, the distance between the injection port and the bottom wall of the combustion chamber cavity on the central axis of the injection nozzle is longer than that of the prior art. This will serve to prevent the fuel droplets from impinging directly upon the inner wall of the combustion chamber cavity (thus not causing the emission of the black or white smoke) and will serve to better mix the injected fuel with the air in the combustion chamber cavity.

Furthermore, even if the injection port of the injection nozzle is positioned in the vicinity of the upper portion just above the open edge of the combustion chamber cavity, which is formed in the top of the piston, the volume of the auxiliary cavity to be added to the combustion chamber cavity face is only from 0.3 to 10% of the total volume of the combustion chamber cavity within the maximum spray diverging angle range of from 20 to 120 degrees. Thus, the reduction in the compression ratio of the internal combustion engine can be prevented as much as possible even with the addition of the auxiliary cavity so that the spontaneous ignition immediately after the engine start is not deteriorated and so that the specific fuel consumption is also not deteriorated.

Although the foregoing description has been directed mainly to the example in which the present invention is applied to the Diesel engine, the present invention can provide an internal combustion engine which is free from the preignition and which can enjoy an excellent combustion efficiency, even if it is applied to a gasoline engine of the type in which the fuel is injected directly into the combustion chamber.

The notched wall which can form the most proper auxiliary cavity in the present invention is formed by following the conical surface of the aforementioned cone having as its apex a point located at such a distance upstream of the injection port along the central axis thereof that the conical surface of the cone is apart from the actual fuel spray pattern by a distance not more than 2.5 mm in the normal direction thereof.

Although specific embodiments of the invention have been illustrated and described, it will be understood that various alterations may be made therein without departing from the scope of the invention as defined by the appended claims.

What is claimed is:

1. A fuel injection type internal combustion engine comprising:
    a cylinder body formed with a cylinder chamber;
    a cylinder head mounted on said cylinder body;
    a piston adapted to be reciprocated within said cylinder chamber and to define a combustion chamber between the top thereof and said cylinder head;
    an injection nozzle mounted at a predetermined position in one of said cylinder head and said cylinder body for injecting fuel into said combustion chamber at a large spray diverging angle, said injection nozzle having its central axis inclined at a predetermined angle with respect to the top of said piston and its leading end portion facing said combustion chamber in a manner that its injection port is offset from the center of said cylinder chamber; and
    said combustion chamber comprising a combustion chamber cavity opened in the top of said piston and an auxiliary cavity formed in the opening portion of said combustion chamber cavity, said auxiliary cavity being defined by a notched wall with surfaces shaped so that the auxiliary cavity has a minimum required volume and so that injected fuel is prevented from contacting said notched wall, the shape of the notched wall being determined by following the shape of the fuel injection pattern at the maximum spray diverging angle at each piston position while the piston travels during the fuel injection,
    thereby allowing fuel to be injected at a large spray diverging angle through said auxiliary cavity without colliding against the wall of said combustion chamber while minimizing the decrease of the compression ratio of the engine.

2. A fuel injection type internal combustion engine comprising:
    a cylinder body formed with a cylinder chamber;
    a cylinder head mounted on said cylinder body;
    a piston adapted to be reciprocated within said cylinder chamber and to define a combustion chamber between the top thereof and said cylinder head;
    an injection nozzle mounted at a predetermined position in one of said cylinder head and said cylinder body for injecting fuel into said combustion chamber at a large spray diverging angle, said injection nozzle having its central axis inclined at a predetermined angle with respect to the top of said piston and its leading end portion facing said combustion chamber in a manner that its injection port is offset from the center of said cylinder chamber; and
    said combustion chamber comprising a combustion chamber cavity opened in the top of said piston and an auxiliary cavity formed in the opening portion of said combustion chamber cavity, said auxiliary cavity being defined by a notched wall with surfaces shaped so that the auxiliary cavity has a minimum required volume and so that injected fuel is prevented from contacting said notched wall, the shape of the notched wall being determined by following a conical surface of a cone which is relatively moved with respect to said piston while said piston travels from the top dead center position and one of the before top dead center position where fuel injection starts and the after top dead center position where fuel injection terminates, said one of the before and after top dead center positions having a larger predetermined distance to the top dead center position than the other, said cone being drawn by employing (1) as its apex a point located at a predetermined distance upstream of said injection nozzle along the central axis thereof, (2) as its center the central axis of said injection nozzle, and (3) as its apex angle the predetermined maximum spray diverging angle of said injection nozzle,
    thereby allowing fuel to be injected at a large spray diverging angle through said auxiliary cavity without colliding against the wall of said combustion chamber while minimizing the decrease of the compression ratio of the engine.

3. A fuel injection type internal combustion engine according to claim 2, wherein said auxiliary cavity has a volume ranging from 0.3% to 10% of the total volume of said combustion chamber cavity and said auxiliary cavity.

4. A fuel injection type internal combustion engine according to claim 2, wherein said injection nozzle has the maximum spray diverging angle ranging from 20 degrees to 120 degrees with respect to the central axis thereof.

5. A fuel injection type internal combustion engine according to claim 2, wherein said point as the apex of said cone is located at such a distance upstream of said injection port along the central axis thereof that the conical surface of said cone is apart from the actual fuel spray pattern by a distance not more than 2.5 mm in the normal direction thereof.

6. A fuel injection type internal combustion engine according to claim 2, wherein the shape of the notched wall is determined by following the conical surface of said cone which is relatively moved with respect to said piston while said piston travels between the top dead center position and the before top dead center position where fuel injection starts.

* * * * *